United States Patent
Drew et al.

(10) Patent No.: US 10,322,810 B2
(45) Date of Patent: Jun. 18, 2019

(54) IN-FLIGHT LEVELING SYSTEM

(71) Applicant: Gulfstream Aerospace Corporation, Savannah, GA (US)

(72) Inventors: Dale Drew, Grosse Pointe Farms, MI (US); Patrick Thomas Whalen, Columbus, MI (US)

(73) Assignee: Gulfstream Aerospace Corporation, Savannah, GA (US)

(*) Notice: Subject to any disclaimer, the term of this patent is extended or adjusted under 35 U.S.C. 154(b) by 0 days.

(21) Appl. No.: 15/868,085

(22) Filed: Jan. 11, 2018

(65) Prior Publication Data
US 2018/0134395 A1 May 17, 2018

Related U.S. Application Data

(63) Continuation of application No. 14/921,147, filed on Oct. 23, 2015, now Pat. No. 9,884,684.

(60) Provisional application No. 62/067,969, filed on Oct. 23, 2014.

(51) Int. Cl.
*B64D 11/06* (2006.01)
*B60N 2/10* (2006.01)
*B60N 2/18* (2006.01)

(52) U.S. Cl.
CPC ............ *B64D 11/0696* (2013.01); *B60N 2/10* (2013.01); *B60N 2/1835* (2013.01); *B60N 2/1885* (2013.01); *B60N 2/1892* (2013.01); *B64D 11/064* (2014.12)

(58) Field of Classification Search
CPC .... B64D 11/06; B64D 11/0696; B64D 11/064
USPC ......... 244/118.6; 297/1, 313, 317, 322, 326, 297/327, 335, 344.22; 248/394–397, 419
See application file for complete search history.

(56) References Cited

U.S. PATENT DOCUMENTS

| | | | |
|---|---|---|---|
| 3,471,140 A | 10/1969 | Ballard |
| 3,695,570 A | 10/1972 | Ishida |
| 4,390,207 A | 6/1983 | Resag et al. |

(Continued)

FOREIGN PATENT DOCUMENTS

| | | |
|---|---|---|
| DE | 4303021 A1 | 8/1994 |
| GB | 1346060 | 2/1974 |
| WO | 0021779 A1 | 4/2000 |

OTHER PUBLICATIONS

European Patent Office, Extended European Search Report for Application No. 15 852 063.5-1010 dated Apr. 30, 2018.

*Primary Examiner* — Muhammad Ijaz
(74) *Attorney, Agent, or Firm* — LKGlobal | Lorenz & Kopf, LLP (57) ABSTRACT

The disclosed embodiments relate to an aircraft having an in-flight leveling system for a seat onboard the aircraft that includes a swivel mechanism providing selective rotational movement of the a rear portion of the seat to compensate for an angle of inclination of the aircraft during flight. A locking mechanism is coupled to the swivel mechanism to retain the seat in a first position for use on the ground and a second position for use during flight. An actuator moves the locking mechanism between a locked condition and an unlocked condition permitting the seat to move between the first position to the second position enabling the seat to be substantially level when the aircraft is on the ground and during flight.

20 Claims, 6 Drawing Sheets

(56) References Cited

U.S. PATENT DOCUMENTS

| | | | | |
|---|---|---|---|---|
| 4,529,158 A * | 7/1985 | Sautter, Jr. | B60N 2/1803 | 248/393 |
| 4,529,159 A * | 7/1985 | Terada | B60N 2/1615 | 248/421 |
| 4,767,156 A * | 8/1988 | Yamada | B60N 2/1615 | 248/394 |
| 4,779,832 A * | 10/1988 | Rees | B60N 2/1615 | 248/421 |
| 4,781,414 A * | 11/1988 | Periou | B60N 2/163 | 248/396 |
| 4,993,678 A * | 2/1991 | Easter | B60N 2/1615 | 248/371 |
| 5,310,154 A * | 5/1994 | Ueda | B60N 2/242 | 248/394 |
| 5,466,047 A * | 11/1995 | Bauer | B60N 2/2352 | 297/367 R |
| 5,823,614 A | 10/1998 | Johnson et al. | | |
| 6,264,274 B1 * | 7/2001 | Frohnhaus | B60N 2/1615 | 297/313 |
| 6,902,234 B2 * | 6/2005 | Becker | B60N 2/0715 | 248/421 |
| 7,654,615 B2 | 2/2010 | Ventura et al. | | |
| 7,658,443 B2 * | 2/2010 | Musale | B60N 2/1615 | 297/216.1 |
| 8,585,146 B1 | 11/2013 | Giasson et al. | | |
| 8,585,148 B2 * | 11/2013 | Yamada | B60N 2/1615 | 297/344.14 |
| 8,800,947 B2 * | 8/2014 | Suzuki | B60N 2/161 | 248/421 |
| 9,073,453 B2 | 7/2015 | Erhel | | |
| 2002/0063419 A1 * | 5/2002 | Susko | B60N 2/002 | 280/735 |
| 2003/0047975 A1 * | 3/2003 | Becker | B60N 2/1615 | 297/313 |
| 2004/0004382 A1 * | 1/2004 | Dowty | B64D 11/06 | 297/354.1 |
| 2006/0220411 A1 * | 10/2006 | Pathak | B60N 2/01541 | 296/65.11 |
| 2008/0035828 A1 * | 2/2008 | Kennedy | B64D 11/0696 | 248/544 |
| 2008/0224519 A1 * | 9/2008 | Ventura | B60N 2/06 | 297/313 |
| 2008/0224520 A1 | 9/2008 | Veluswamy et al. | | |
| 2009/0152889 A1 * | 6/2009 | Jeong | B60N 2/3011 | 296/65.09 |
| 2009/0242700 A1 | 10/2009 | Raymond | | |
| 2011/0101751 A1 * | 5/2011 | Meister | B64D 11/06 | 297/319 |
| 2011/0133030 A1 * | 6/2011 | Kennedy | B64D 11/06 | 244/118.5 |
| 2013/0161989 A1 * | 6/2013 | Ito | B60N 2/1615 | 297/313 |
| 2014/0077554 A1 * | 3/2014 | Fujioka | B60N 2/067 | 297/313 |
| 2014/0191081 A1 * | 7/2014 | Ward | B64D 11/06 | 244/122 R |
| 2015/0008708 A1 | 1/2015 | Erhel | | |
| 2015/0008709 A1 | 1/2015 | Erhel | | |
| 2015/0008713 A1 | 1/2015 | Erhel | | |
| 2015/0008714 A1 | 1/2015 | Erhel | | |
| 2016/0114893 A1 * | 4/2016 | Drew | B64D 11/064 | 248/188.3 |

* cited by examiner

FIG. 9

IN-FLIGHT LEVELING SYSTEM

CROSS-REFERENCE TO RELATED APPLICATIONS

This application is a continuation of U.S. application Ser. No. 14/921,147, filed Oct. 23, 2015, which claims the benefit of U.S. Provisional Application No. 62/067,969 filed Oct. 23, 2014. The complete disclosure of the above-identified applications are hereby fully incorporated herein in their entirety by reference.

TECHNICAL FIELD

The present invention relates to an in fight leveling system, and more particularly, to an in-flight leveling system for adjusting a seat assembly to a horizontally level position in relationship to the angular inclination of an aircraft.

BACKGROUND

Aircraft currently include one or more seat assemblies for supporting passengers in the aircraft during flight. The seat assembly includes a seat cushion securely mounted to the floor of the aircraft by a riser or support base and a seat back pivotally coupled to the seat cushion for providing pivotal reclining movement of the seat back relative to the seat cushion for passenger comfort. The seat back is selectively pivotal between a generally upright TTL (taxi, take-off, and landing) position and a rearward fully reclined position. Additionally, it is known to provide a swivel mechanism to allow the seat assembly to rotate about a vertical axis relative to the support base and a slide mechanism to allow the seat assembly to move fore and aft or laterally relative to the support base to also provide passenger comfort, function, and selective adjustability.

However, aircrafts during flight typically fly with an angle of inclination of approximately 3 to 4.5 degrees from horizontal. Such an angle of inclination often makes it difficult for the passenger to overcome the force imposed by the angle of inclination to manually return the seat assembly from a reclined position to the TTL position or move the seat assembly fore and aft by the slide mechanism or swivel mechanism.

Accordingly, it is desirable to provide an in-flight leveling system which selectively positions the seat assembly in a horizontally level position in relation to the angle of inclination of the aircraft to assist the passenger in returning the seat assembly to the TTL position. Other desirable features and characteristics will become apparent from the subsequent summary and detailed description and the appended claims, taken in conjunction with the accompanying drawings and the foregoing technical field and background.

SUMMARY

The disclosed embodiments relate to an in-flight seat leveling system for an aircraft cabin seat.

In a first non-limiting embodiment, an in-flight leveling system for a seat onboard an aircraft includes a swivel mechanism providing selective rotational movement of a rear portion of the seat to compensate for an angle of inclination of the aircraft during flight. A locking mechanism is coupled to the swivel mechanism to retain the seat in a first position for use on the ground and a second position for use during flight. An actuator moves the locking mechanism between a locked condition and an unlocked condition permitting the seat to move between the first position to the second position enabling the seat to be substantially level when the aircraft is on the ground and during flight.

In a second non-limiting embodiment, an in-flight leveling system includes a pair of spaced apart support base risers with a front pivot rod extending between the risers and a rear slide rod extending between the risers that support a seat mounting assembly. The rear slide rod is guided by arcuate slots formed in the pair of spaced apart support base risers to move in the arcuate slots between a first position and a second position causing a rear portion the seat to rise when the rear slide rod moves from the first position toward the second position. A sector pivotally coupled to one of the pair of spaced apart support base risers and has an arcuate toothed rack and an opening for receiving the rear slide rod. A locking mechanism is coupled adjacent to the sector for selectively engaging the arcuate toothed rack under control of an actuator for moving the locking mechanism between a locked condition and an unlocked condition permitting the rear slide rod to move within the arcuate slots between the first position and the second position. This permits the seat mounting assembly (and thus a seat) to be substantially level when the aircraft is on the ground and during flight.

In a third non-limiting embodiment, a method for leveling an seat onboard the aircraft includes raising an aft portion of the seat an amount to compensate for the angle of inclination and return the seat to a substantially level position during flight.

DESCRIPTION OF THE DRAWINGS

Embodiments of the present invention will hereinafter be described in conjunction with the following drawing figures, wherein like numerals denote like elements.

DETAILED DESCRIPTION

As used herein, the word "exemplary" means "serving as an example, instance, or illustration." The following detailed description is merely exemplary in nature and is not intended to limit the invention or the application and uses of the invention. Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary or the following description.

The disclosed embodiments relate to an aircraft having an interior door with a compressible header. Accordingly to non-limiting embodiments, an aircraft seat is provided with an in-flight leveling system that maintains the seat in a substantially level position during flight as well as when on the ground. A rear or aft portion of the aircraft seat is raised or elevated during flight to compensate for the 3-4.5 degree angle of inclination of the aircraft during flight.

Figure 1:
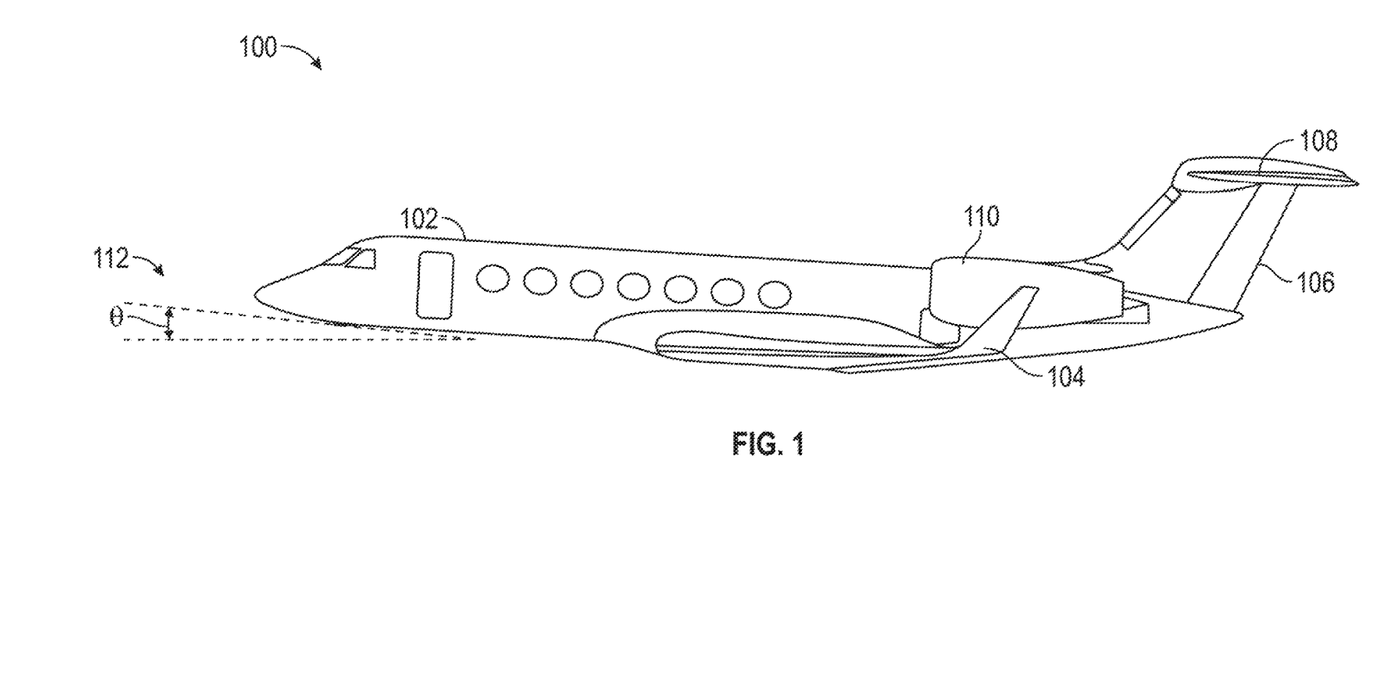
FIG. 1 is a view of an aircraft in which the disclosed embodiments can be implemented in accordance with a non-limiting implementation.

FIG. 1 is a view of an aircraft 100 in which the disclosed embodiments can be implemented in accordance with one exemplary, non-limiting implementation. In accordance with one non-limiting implementation of the disclosed embodiments, the aircraft 100 includes fuselage 102, which holds the passengers and cargo; two main wings 104, which provide the lift needed to fly the aircraft 100; a vertical stabilizer 106 and two horizontal stabilizers 108, which are used to ensure a stable flight; and two engines 110, which provide the thrust needed to propel the aircraft 100 forward. Flight control surfaces are placed on wings 104, vertical stabilizer 106 and the horizontal stabilizers 108 to guide the aircraft 100. During flight, the aircraft 100 typically will fly with an angle of inclination (θ) 112 of approximately 3 to 4.5 degrees from horizontal. This causes the passenger seats in the cabin to be tilted back by the same angle. Some passengers may find it difficult to easily rise from the seat or return the seatback to an upright position from a reclined position.

Figure 2:
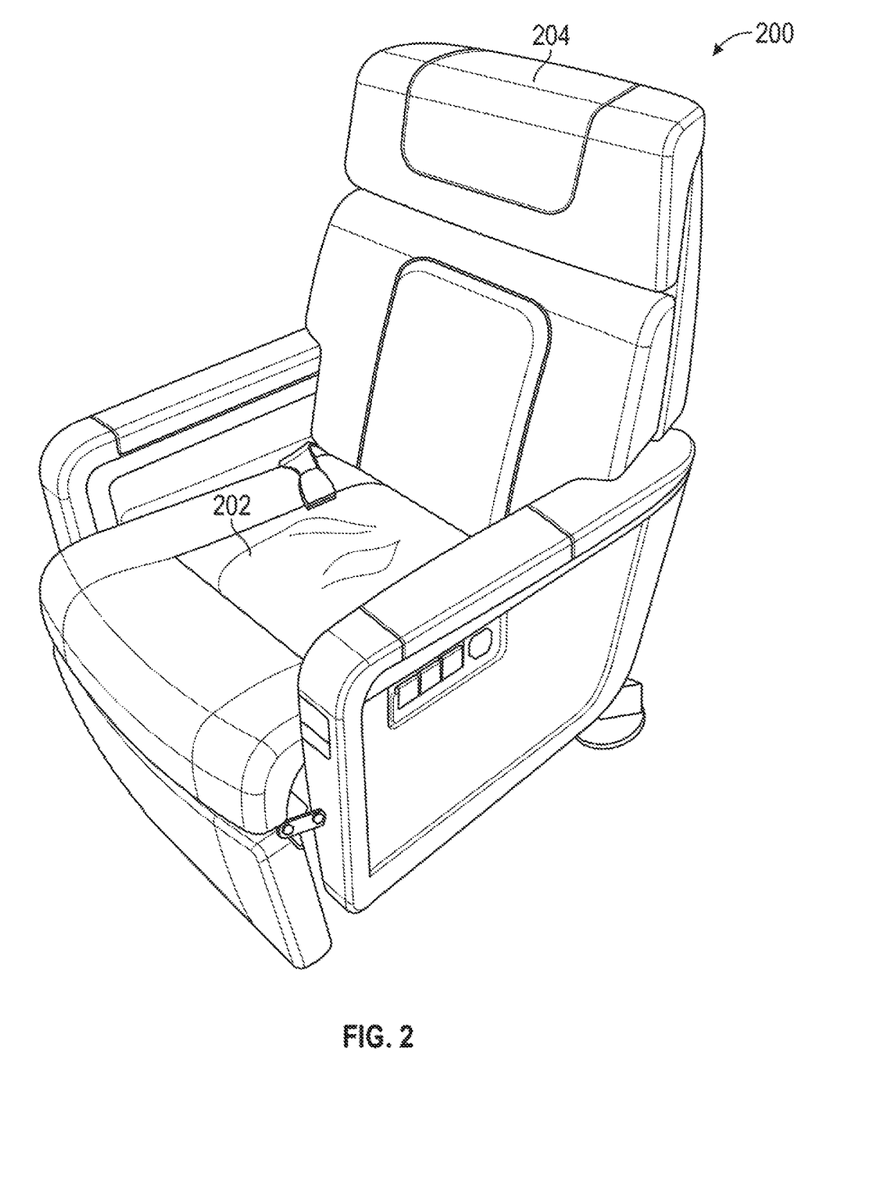
FIG. 2 is a view of an aircraft seat in which the disclosed embodiments can be implemented in accordance with a non-limiting implementation.

FIG. 2 is an illustration of an aircraft seat in which the disclosed embodiments can be implemented in accordance with one exemplary, non-limiting implementation. The seat assembly 200 includes a generally horizontal seat cushion 202 and a generally upright seat back 204 pivotally coupled to the seat cushion 202 for supporting a seat occupant or passenger as is commonly known in the art. In some embodiments, the seat assembly 200 includes a swivel mechanism provides selective rotational movement of the seat assembly about a vertical axis relative the floor of the aircraft and a slide mechanism that provides selective fore/aft and lateral movement of the seat assembly 200. At the base of the seat assembly is a support base (illustrated in FIGS. 3-9) that couples the seat assembly 200 securely to the floor of the aircraft 100.

Figure 3:
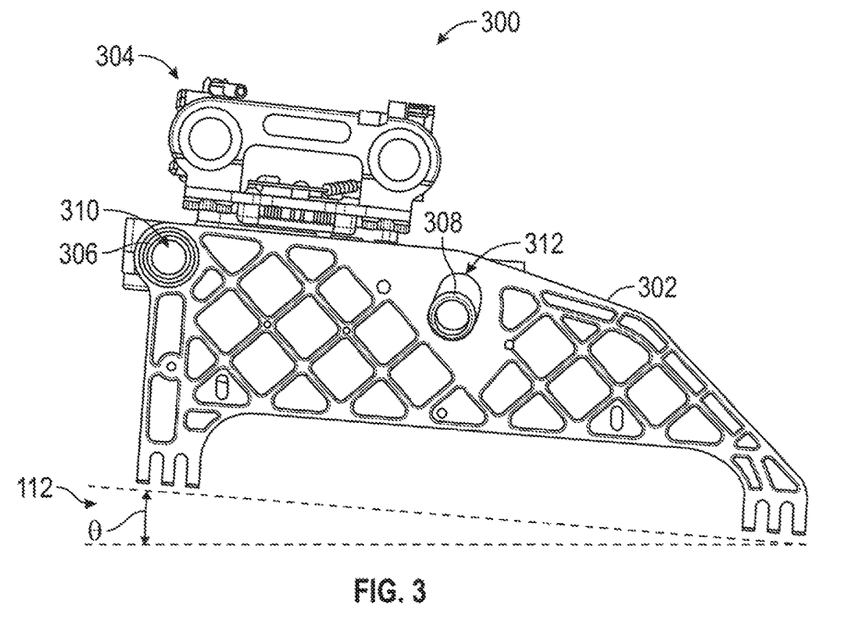
FIG. 3 is a side view of the in-flight leveling system prior to deployment implemented in accordance with a non-limiting implementation.

FIG. 3 is an illustration of one non-limiting embodiment of an aircraft seat support base 300 following the teachings of the present disclosure. The aircraft seat support base 300 includes a pair of spaced apart risers 302 (one shown in FIG. 3) that supports a track and swivel assembly 304 via a front pivot rod 306 and a rear swivel rod 308 that extend between the pair of spaced apart risers 302. The front pivot rod 306 is received by the risers 302 via an opening 310 and a rear swivel rod 308 is received by the risers 302 by an arcuate guide slot 312. FIG. 3 illustrates the seat support base 300 during flight. Since the aircraft 100 is traveling at an angle of inclination (112 in FIG. 1), the seat support base 302 is also angled toward the aft of the aircraft by the same angle 112.

Figure 4:
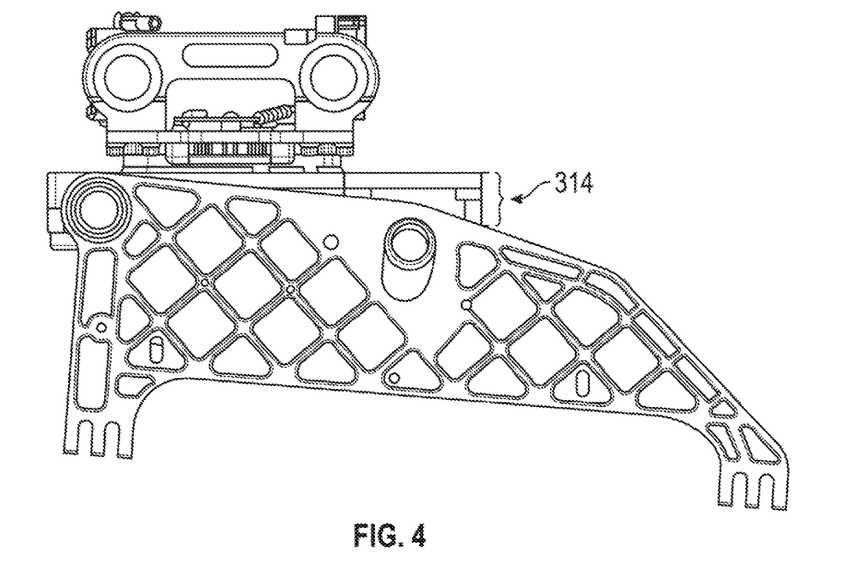
FIG. 4 is a side view of the in-flight leveling system after deployment implemented in accordance with a non-limiting implementation.

In FIG. 4, the in-flight seat leveling system has been actuated and the aft portion of the seat mounting assembly has risen by a distance 314. In some embodiments, the distance 314 is approximately one-half inch (12.7 millimeters) to compensate for the angle of inclination 112. Accordingly, FIGS. 3 and 4, illustrate the in-flight leveling system that operatively couples the seat support base to the risers for selective movement between an angled position during flight, shown in FIG. 3, that is generally parallel with the angle of inclination of the aircraft in flight and thus the floor of the aircraft, and in a horizontally level position, shown in FIG. 4, generally horizontal during flight.

Figure 5:
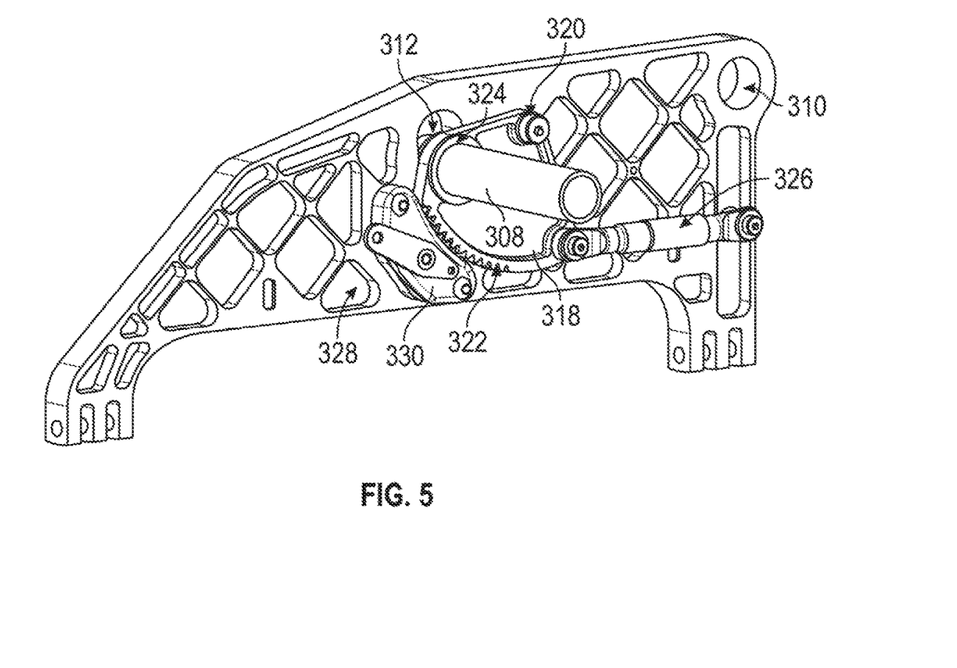
FIG. 5 is a fragmentary perspective view of the in-flight leveling system prior to deployment implemented in accordance with a non-limiting implementation.
Figure 6:
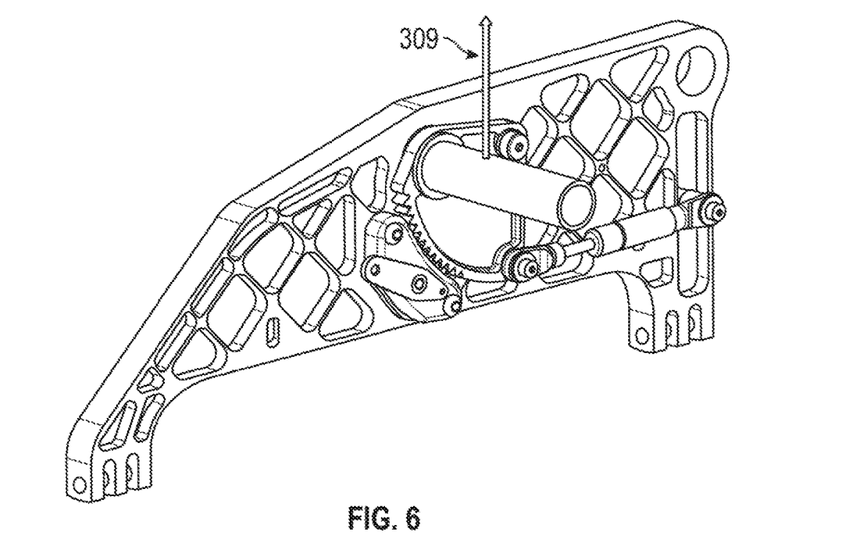
FIG. 6 is a fragmentary perspective view of the in-flight leveling system after deployment implemented in accordance with a non-limiting implementation.

FIG. 5 is a fragmentary perspective view of the in-flight leveling system. As noted above, the in-flight leveling system includes a front pivot rod (not shown in FIG. 5) extending between the risers 302 and pivotally coupled the seat support base 300 to the riser 302, and a rear slide rod 308 extending between the risers 302 and having opposite ends slidably guided with arcuate slots 312 formed in the respective risers 302. The in-flight leveling system further includes a sector 318 pivotally coupled at 320 to the riser 302 adjacent the rear slide rod 308 having an arcuate toothed rack 322 extending between first and second ends. The rear slide rod 308 passes thru an opening 324 in the sector 381 adjacent the first end thereof and into the arcuate slot in the riser. An assist piston 326 extends between a first end coupled to the sector 318 adjacent the second end and a second end coupled to the riser 302.

Figure 7:
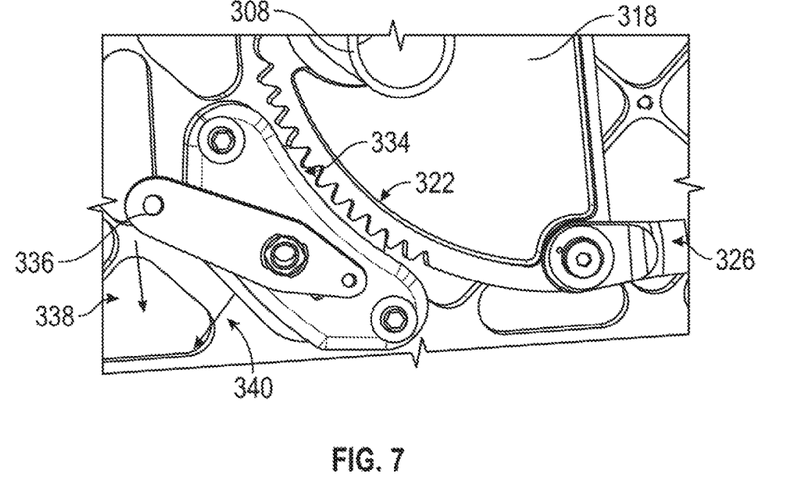
FIG. 7 is a side view of a lock mechanism implemented in accordance with a non-limiting implementation and shown in a locked position.
Figure 8:
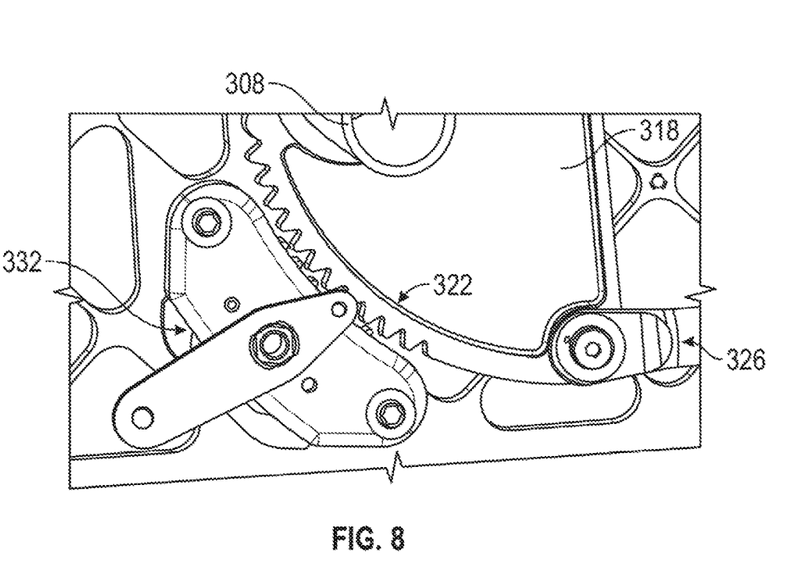
FIG. 8 is a side view of a lock mechanism shown implemented in accordance with a non-limiting implementation and shown in an unlocked position.

Referring now to FIGS. 5-8, in-flight leveling system further includes a locking mechanism 328 fixedly secured to the riser 302 for selectively actuating the in-flight leveling system between a locked and unlocked condition. The locking mechanism 328 includes a guide 330 for slidably supporting a pawl and a cam (shown in FIG. 9) for engaging and sliding the pawl between a locked position engaged with the sector (shown in FIG. 7) and an unlocked position spaced from the sector (shown in FIG. 8). The pawl 332 includes a plurality of teeth 334 for meshed engagement with the toothed rack 322 on the sector 318 to lock the sector in the locked condition. An actuator handle 336 is coupled to the cam (shown in FIG. 9) for rotating the cam and force the pawl 332 to slide along the guide 330 between the locked and unlocked positions. Accordingly, to acutate the in-flight leveling system with the seat assembly in an angled position, the passenger actuates the actuator handle 336 in a direction indicated by arrow 338 to rotate the cam and actuate the pawl 332 in the direction indicated by arrow 340 from the locked condition engaged with the sector 318 to the unlocked condition spaced and disengaged from the sector 318. The piston 326 biases the sector 318 to rotate in the clockwise direction, shown in the drawings, to lift the rear slide rod 308 upwardly as shown by arrow 309 along the arcuate slots 312 in the risers 302 about the pivot formed by the front pivot rod 306 to raise the track and swivel assembly 304 to the horizontally level position relative to the angle of inclination of the aircraft and floor. Once in the horizontally level position, the passenger can easily adjust the seat assembly and return the seat assembly to the taxi, takeoff and landing position as necessary. Returning the actuator handle to its original position reengages the locking mechanism 328 as shown in FIG. 7.

Figure 9:
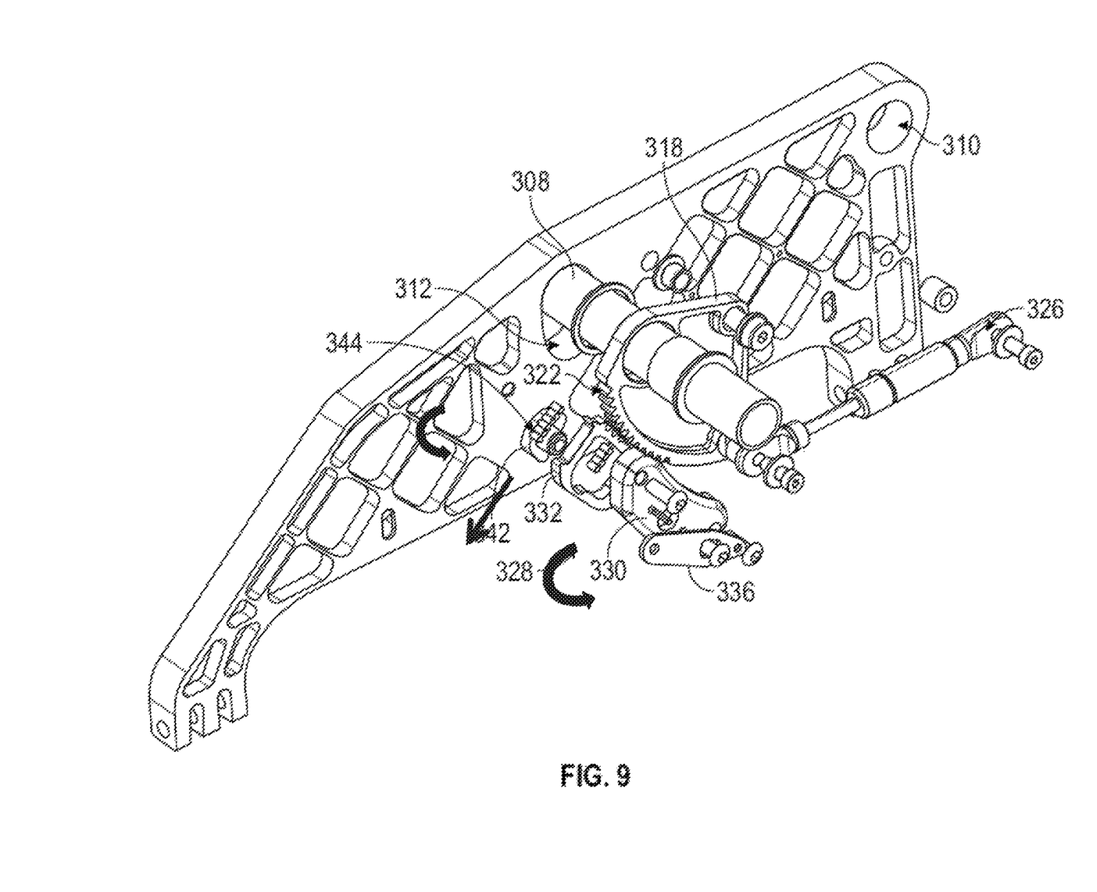
FIG. 9 is an exploded perspective view of the in-flight leveling system in accordance with a non-limiting implementation.

FIG. 9 illustrates an exploded view of the in-flight seat leveling system illustrating the components of the locking mechanism 328. As noted above, within the guide 330, is the pawl 332 and a cam 342. As the actuator handle 336 is operated, the cam 342 rotates and moves the pawl 332 within the guide 330 via pin bearings 344. The action moves the teeth 334 of the pawl 332 away from the toothed rack 322 of the sector 318 thereby disengaging the pawl 332 from the sector 318. The sector is permitted to rotate assisted by the piston 326 causing the rear pivot rod (and thus the seat mounting assembly) to move upwards rising the aft or rear portion of the seat to a level position.

The present invention provides an improved seat that compensates for the angle on inclination of the aircraft 100 during flight. The disclosed embodiments can provide an aircraft seat the ability to remain substantially level during flight as well as when on the ground.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other through one or more additional elements.

While at least one exemplary embodiment has been presented in the foregoing detailed description, it should be appreciated that a vast number of variations exist. For example, although the disclosed embodiments are described with reference to a door used on an aircraft, those skilled in the art will appreciate that the disclosed embodiments could be implemented in other types of vehicles. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An in-flight leveling system for a seat onboard an aircraft, the seat having a seat cushion and a seat back and the aircraft traveling at an angle of inclination during flight, comprising:
   a seat track and swivel mechanism coupled to the seat and to the leveling system, the seat track and swivel mechanism having a front pivot point providing selective arcuate movement of an aft portion of the seat to compensate for the angle of inclination of the aircraft during the flight;
   the leveling system, comprising:
      a locking mechanism positioned beneath and coupled to the seat track and swivel mechanism to retain the seat in a first position and a second position; and
      an actuator positioned beneath the seat track and swivel mechanism for moving the locking mechanism between a locked condition and an unlocked condition permitting the aft portion of the seat to move between the first position to the second position;
   whereby, the actuator moves the locking mechanism from the locked condition to the unlocked condition permitting the aft portion of the seat to move from the first position to the second position to remain substantially level during the flight due to the seat track and swivel mechanism compensating for the angle of inclination of the aircraft during the flight.

2. The in-flight leveling system for a seat onboard an aircraft during flight of claim 1, further comprising a piston positioned beneath and coupled to the seat track and swivel mechanism to bias the aft portion of the seat from the first position toward the second position.

3. The in-flight leveling system for a seat onboard an aircraft during flight of claim 1, wherein the swivel mechanism comprises:
   a front pivot rod positioned beneath the swivel mechanism and extending between a pair of spaced apart support base risers;
   a rear slide rod positioned beneath the swivel mechanism and extending between the pair of spaced apart support base risers and guided by arcuate slots formed in the pair of spaced apart support base risers; and
   a sector positioned beneath the seat track and swivel mechanism and pivotally coupled to one of the pair of spaced apart support base risers, the sector having an arcuate toothed rack and an opening for receiving the rear slide rod.

4. The in-flight leveling system for a seat onboard an aircraft during flight of claim 3, wherein the locking mechanism comprises a pawl positioned beneath the seat track and swivel mechanism and having teeth to selectively engage the arcuate toothed rack of the sector.

5. The in-flight leveling system for a seat onboard an aircraft during flight of claim 4, where the actuator comprises a lever positioned beneath the seat track and swivel mechanism and causing a cam to move the pawl toward or away from the arcuate toothed rack of the sector.

6. The in-flight leveling system for a seat onboard an aircraft during flight of claim 1, wherein the angle of inclination of the aircraft during the flight is approximately 3-4.5 degrees.

7. The in-flight leveling system for a seat onboard an aircraft during flight of claim 1, wherein the aft portion of the seat is raised approximately one-half inch in the second position relative to the first position.

8. An in-flight leveling system for adjusting a seat onboard an aircraft while the aircraft is traveling at an angle of inclination during flight, comprising:
   a pair of spaced apart base risers;
   a seat track and swivel mechanism coupled to the seat and to the leveling system;
   the leveling system comprising:
      a front pivot rod extending between the pair of spaced apart base risers and by a rear slide rod extending between the pair of spaced apart base risers and guided by arcuate slots formed in the pair of spaced apart base risers, the front pivot rod providing a front pivot point and the rear slide rod providing selective arcuate movement of an aft portion of the seat to compensate for the angle of inclination of the aircraft during the flight;
      a locking mechanism positioned beneath the seat track and swivel mechanism on at least one of the pair of spaced apart base risers and operably coupled to the seat track and swivel mechanism to retain the seat in a first position and a second position; and an actuator positioned beneath the seat track and swivel mechanism for moving the locking mechanism between a locked condition and an unlocked condition permitting the aft portion of the seat to move between the first position to the second position;

whereby, the actuator moves the locking mechanism from the locked condition to the unlocked condition permitting the aft portion of the seat to move from the first position to the second position to remain substantially level during the flight due to rise of the seat track and swivel mechanism compensating for the angle of inclination of the aircraft during the flight.

9. The in-flight leveling system of claim 8, further comprising a piston positioned beneath the seat track and swivel mechanism and coupled between one of the pair of spaced apart base risers and the leveling system to bias the aft portion of the seat from the first position toward the second position.

10. The in-flight leveling system of claim 8, wherein the leveling system further comprises a sector positioned beneath the seat track and swivel mechanism and coupled to one of the pair of spaced apart base risers and to the rear slide rod, the sector having an arcuate toothed rack.

11. The in-flight leveling system of claim 10, wherein the locking mechanism comprises a pawl positioned beneath the seat track and swivel mechanism and having teeth to selectively engage the arcuate toothed rack of the sector.

12. The in-flight leveling system of claim 11, where the actuator comprises a lever positioned beneath the seat track and swivel mechanism and causing a cam to move the pawl toward or away from the arcuate toothed rack of the sector.

13. The in-flight leveling system of claim 10, further comprising a piston positioned beneath the seat track and swivel mechanism and coupled between one of the pair of spaced apart base risers and sector.

14. The in-flight leveling system of claim 8, wherein the angle of inclination of the aircraft during the flight is approximately 3-4.5 degrees.

15. The in-flight leveling system of claim 8, wherein the aft portion of the seat is raised approximately one-half inch in the second position relative to the first position.

16. An in-flight leveling system for adjusting a seat onboard an aircraft while the aircraft is traveling at an angle of inclination during flight, comprising:

a pair of spaced apart base risers;

a seat track and swivel mechanism coupled to the seat and to the leveling system;

the leveling system comprising:

a front pivot rod extending between the pair of spaced apart base risers and by a rear slide rod extending between the pair of spaced apart base risers and guided by arcuate slots formed in the pair of spaced apart base risers, the front pivot rod providing a front pivot point and the rear slide rod providing selective arcuate movement of an aft portion of the seat to compensate for the angle of inclination of the aircraft during the flight;

a sector positioned beneath the seat track and swivel mechanism and coupled to one of the pair of spaced apart base risers and to the rear slide rod, the sector having an arcuate toothed rack;

a locking mechanism positioned beneath the seat track and swivel mechanism and one of the pair of spaced apart base risers and operably coupled to the sector to retain the seat track and swivel mechanism in a first position and a second position; and an actuator positioned beneath the seat track and swivel mechanism for moving the locking mechanism between a locked condition and an unlocked condition permitting the aft portion of the seat track and swivel mechanism to move between the first position to the second position;

whereby, the actuator moves the locking mechanism from the locked condition to the unlocked condition permitting the aft portion of the seat track and swivel mechanism to move from the first position to the second position to maintain the seat substantially level during the flight due to rise of the seat track and swivel mechanism compensating for the angle of inclination of the aircraft during the flight.

17. The in-flight leveling system of claim 16, wherein the locking mechanism comprises a pawl positioned beneath the seat track and swivel mechanism and having teeth to selectively engage the arcuate toothed rack of the sector.

18. The in-flight leveling system of claim 17, where the actuator comprises a lever positioned beneath the seat track and swivel mechanism and causing a cam to move the pawl toward or away from the arcuate toothed rack of the sector.

19. The in-flight leveling system of claim 16, further comprising a piston positioned beneath the seat track and swivel mechanism and coupled between one of the pair of spaced apart base risers and sector.

20. The in-flight leveling system of claim 16, wherein the angle of inclination of the aircraft during the flight is approximately 3-4.5 degrees.

* * * * *